H. B. NEWHALL.
CONDUIT OR CABLE CLAMP AND BRIDLE RING.
APPLICATION FILED JULY 14, 1920.
1,381,220.
Patented June 14, 1921.
3 SHEETS—SHEET 2.
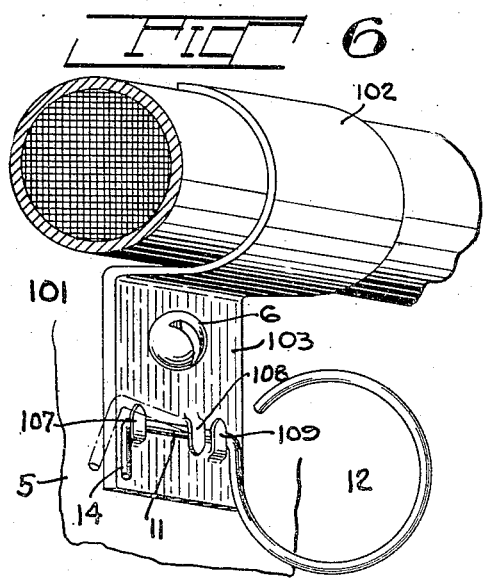
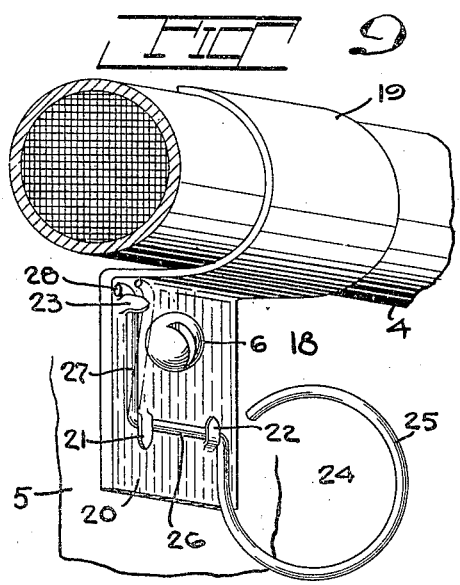
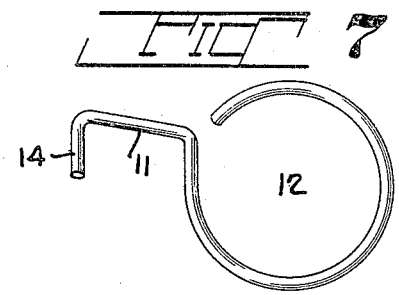
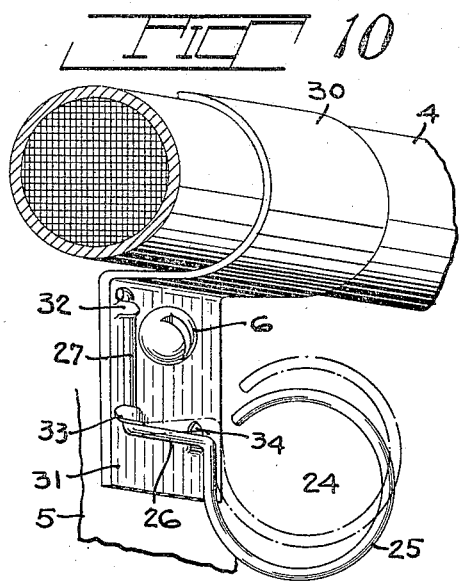
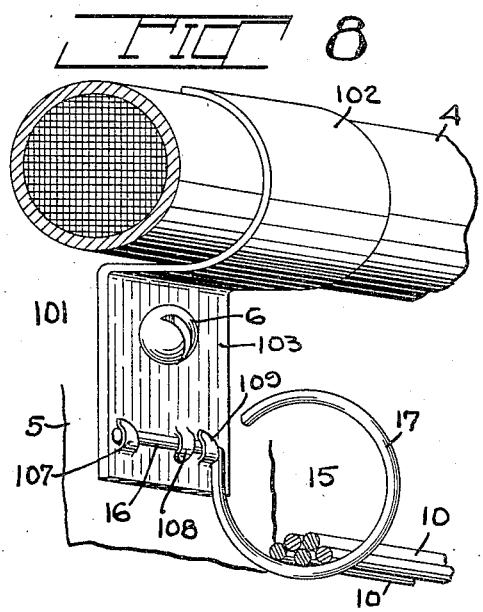
INVENTOR
Henry B. Newhall
BY
Alan M Johnson
ATTORNEY H. B. NEWHALL.
CONDUIT OR CABLE CLAMP AND BRIDLE RING.
APPLICATION FILED JULY 14, 1920.
1,381,220.
Patented June 14, 1921.
3 SHEETS—SHEET 3.
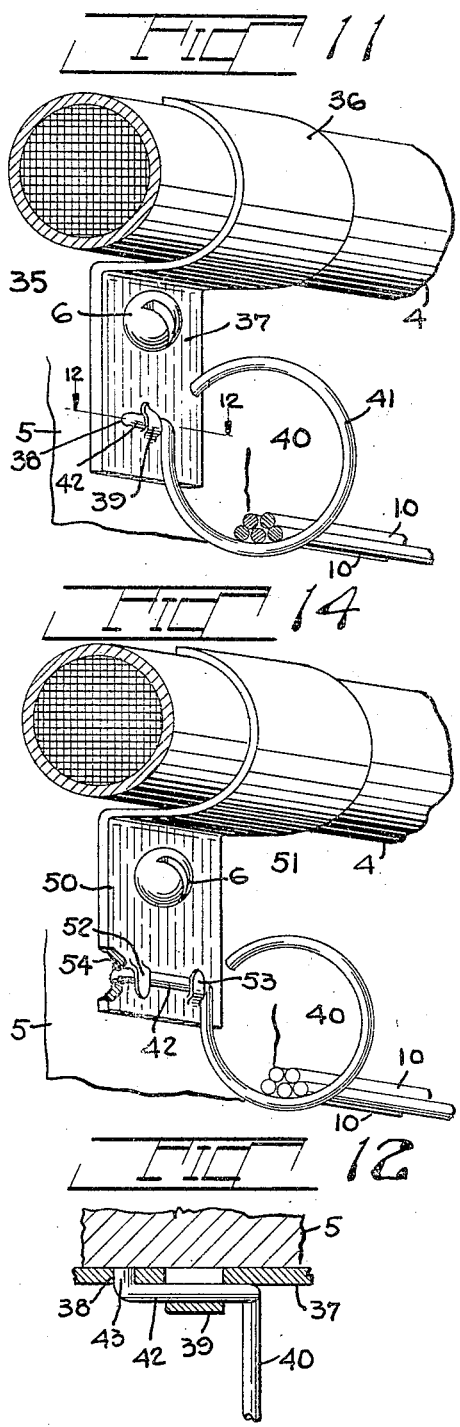
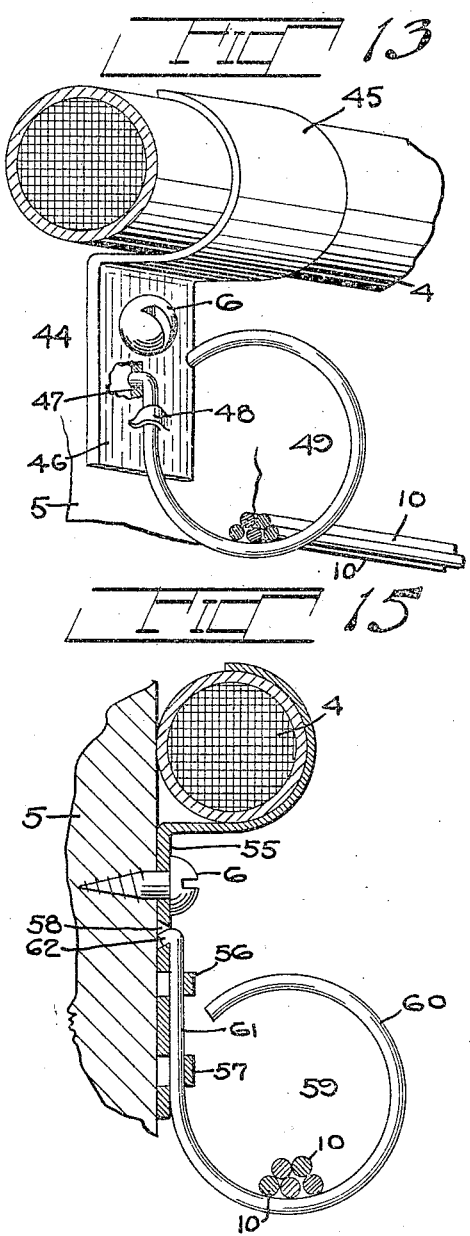

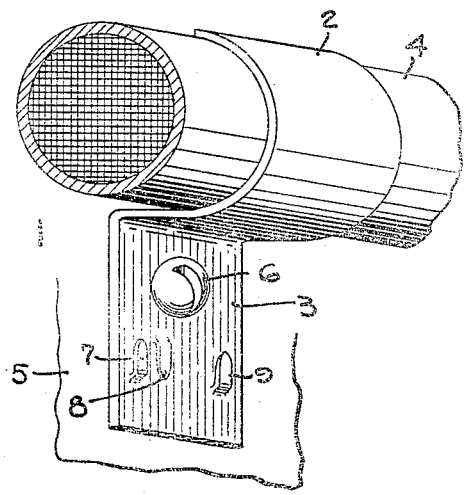
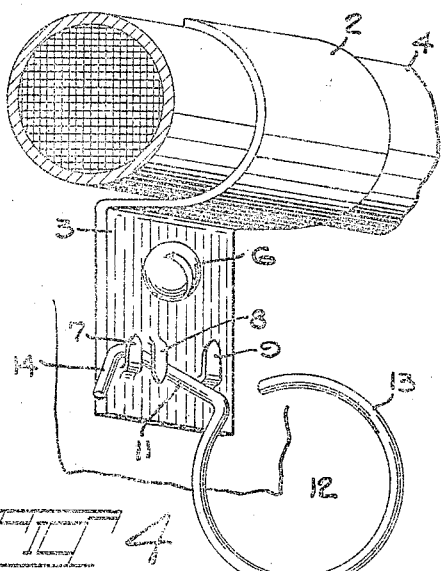
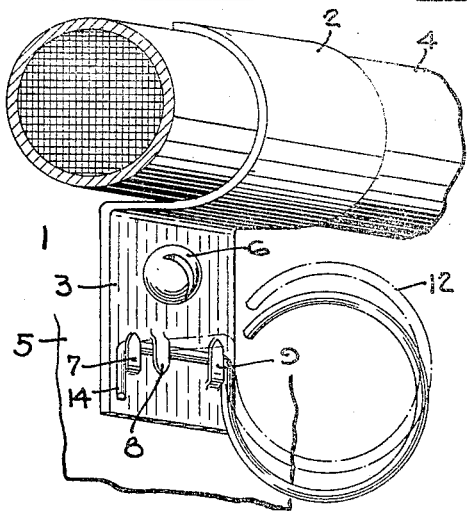
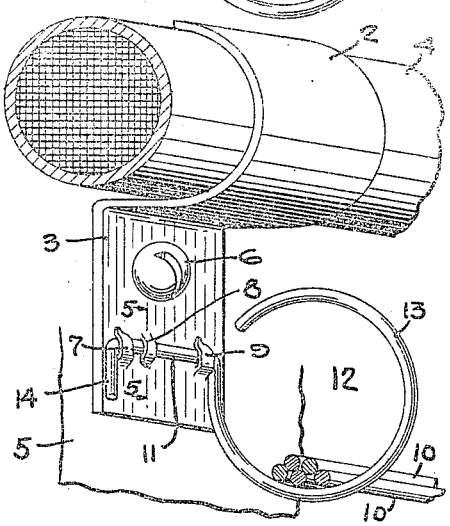
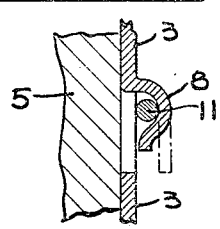

UNITED STATES PATENT OFFICE.

HENRY B. NEWHALL, OF PLAINFIELD, NEW JERSEY.

CONDUIT OR CABLE CLAMP AND BRIDLE-RING.

1,381,220.         Specification of Letters Patent.    Patented June 14, 1921.

Application filed July 14, 1920. Serial No. 396,140.

*To all whom it may concern:*

Be it known that I, HENRY B. NEWHALL, a citizen of the United States, residing at Plainfield, in the county of Union and State of New Jersey, have invented certain new and useful Improvements in Conduit or Cable Clamps and Bridle-Rings, of which the following is a specification, taken in connection with the accompanying drawings.

My invention relates to the combination of a conduit or cable clamp and bridle ring, and also to a cable or conduit clamp and a bridle ring as sub-combinations of the main combination, and as articles of manufacture.

My invention further relates to a cable or conduit clamp, which can be manufactured at minimum expense and to which a bridle ring may be secured either at the original installation of the cable and conduit clamp, or at any future time when it may be desirable to support one or more runs of bridle wires.

My invention further relates to a conduit or cable clamp which is preferably formed out of sheet metal and is provided with coöperating surfaces to receive and hold the bridle ring. My invention further relates to bridle rings which are used with my improved conduit and cable clamps.

My invention further relates to a conduit or cable clamp having lugs struck up from the metal of the base which are adapted to receive and hold the shank of a bridle ring. Preferably, though not necessarily, the lugs are peened or worked with a hammer to securely hold the shank.

My invention further relates to a conduit or cable clamp having means to support a shank of a bridle ring at two points while it is sprung into engagement with another engaging surface on the base. In my invention these three engaging members may, or may not, be in alinement.

My invention further relates to a conduit or cable clamp having a hole to receive the end of a shank of a bridle ring and additional means to engage the shank of said bridle ring.

While my conduit or cable clamp is preferably formed out of pressed sheet material as pressed steel, it may be formed from castings of malleable iron, brass, an alloy, aluminum or any other metal, which can preferably be peened or worked.

My invention further relates to certain combinations, sub-combinations, articles of manufacture, and details of construction, all of which will be more fully hereinafter described and pointed out in the claims.

In the figures, in which I have shown different embodiments of my invention, the same reference numerals refer to similar parts in the several figures.

Figure 1 is a perspective view of my conduit or cable clamp and of a cable which it supports;

Fig. 2 is a perspective view of my conduit or cable clamp, shown in Fig. 1, with one form of bridle ring in its first attaching position;

Fig. 3 is a perspective view of the conduit or cable clamp and bridle ring showing the bridle ring in its attached position;

Fig. 4 is a perspective view showing the lugs peened or hammered down, so as to firmly hold the shank of the bridle ring;

Fig. 5 is a detail vertical section on the line 5—5 of Fig. 4, looking in the direction of the arrows;

Fig. 6 is a perspective view of a conduit or cable clamp, and bridle ring, showing a different manner of mounting the lugs;

Fig. 7 is a perspective view of the bridle ring shown in Figs. 1 to 6, inclusive;

Fig. 8 is a perspective view of a conduit or cable clamp, similar to that shown in Fig. 6, but with a slightly different form of bridle ring;

Fig. 9 is a perspective view of a conduit or cable clamp, with a different arrangement of locking members or lugs, and also a different form of bridle ring;

Fig. 10 is a perspective view of still another modified form of conduit or cable clamp and bridle ring with a different arrangement of locking lugs on the clamp;

Fig. 11 is a perspective view of a modified form of conduit or cable clamp and bridle ring, the cable clamp being provided with a hole or opening for the reception of one end of the bridle ring;

Fig. 12 is a detail horizontal section on line 12—12 of Fig. 11, on an enlarged scale;

Fig. 13 is a perspective view of another modification;

Fig. 14 is a perspective view of still another modification;

Fig. 15 is a vertical section of still another modification of my invention.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit or cable clamp may be used as a separate article of manufacture or subcombination, and then later, when the needs of the service demands it, my bridle ring may be supported by the same conduit or cable clamp, when the complete combination would be used.

In my invention I form a conduit or cable clamp 1, with a hook 2 and a base 3. This conduit or cable clamp supports the cable 4 on the wall or other suitable support 5 by means of the securing screw 6.

I provide the base 3 with locking surfaces, preferably in the form of lugs, which are adapted to coöperate with the shank of a bridle ring. In some forms of my invention these locking lugs are alined. In other forms of my invention at least one of the locking lugs is out of line with the other lugs. In other forms of my invention I provide the base 3 with a locking hole and with a lug.

In the form of my inventions shown in Figs. 1 to 5, inclusive, the conduit or cable clamp is formed from stamped sheet metal and provided with the lugs 7, 8 and 9 oppositely disposed with relation to each other. These lugs are struck up from the metal of the base 3, as more clearly shown in Fig. 5. In this form of my invention I place the lugs 7 and 8 near each other, there being a space or gap between the lug 8 and the oppositely disposed lug 9.

When the cable 4 is originally installed only the conduit or cable clamp 1 will be used. Months, weeks, or years later, if the telephone engineers desire to increase the capacity of the installation by stringing runs of bridle wires 10, 10, this may be done in my invention without disturbing the securing screw 6 or the cable 4, by simply locating one end of the shank 11 of the bridle ring 12 in the oppositely disposed lugs 7 and 8, Fig. 2. These two lugs hold the shank 11 at two points and prevent it pivoting, as for example upon the lug 7. When the bridle ring 12 is raised vertically, as shown in dotted lines in Fig. 3, the shank 11 is sprung over the end of the lug 9, as shown in dotted lines in Fig. 3, and is then brought down on the inside of the lug into the position shown in full lines in Fig. 3. The parts may be left in this position, and the bridle wires 10, 10 may be strung through the open ring 13 of the bridle ring 12. Preferably, however, to securely hold the shank 11 rigid, the ends of the lugs 7, 8 and 9 are peened down or worked with a hammer, as shown in Figs. 4 and 5.

Preferably, though not necessarily, the end of the horizontal shank 11 is provided with a vertical arm 14, which engages over the lug 7 and tends to prevent any endwise movement of the shank 11 in the lugs 7, 8 and 9. Endwise movement in the other direction is prevented by the ring portion 13 of the bridle ring 12 engaging with the lug 9. Of course when the lugs are bent or peened down, as they are in Figs. 4, 5 and 8, and firmly clamped, there is less liability of the shank 11 or 16 working laterally out from under the lugs, than in those cases when the lugs are not bent or worked down.

Instead of arranging the lugs so that the open ring 13 is sprung over the lug 9, I may in some cases form a conduit or cable clamp 101, Fig. 6, having a hook portion 102 and a base 103 with the oppositely disposed lugs 107, 108 and 109. The lugs 108 and 109 are placed near each other and at some distance from lug 107 so that the end of the shank 11 of the bridle ring 12 would be sprung over the lug 107, as shown in dotted line in Fig. 6, rather than in the preferred manner of attaching the bridle ring, shown in Fig. 2.

In some cases I may use with my conduit or cable clamp 101 a bridle ring 15, Fig. 8 having a shank 16, and an open ring 17, the bridle ring being the same as the bridle ring 12, with the omission of the arm 14.

Instead of arranging my engaging surfaces or lugs in line, I may form a conduit or cable clamp 18, Fig. 9, having the hook portion 19 and base 20, the base being provided with two oppositely disposed lugs 21 and 22 in line with each other, and another lug or engaging surface 23 not in alinement with the other two lugs. In this form of my invention the bridle ring 24 is provided with an open ring 25, a horizontal shank 26, a vertical shank 27 and preferably, though not necessarily, with an arm 28.

In positioning this form of bridle ring so as to add to the capacity of the installation whenever the traffic load on the cable 4 becomes excessive, it is merely necessary to hook the shank 26 over the lug 22, and beneath the lug 21. Then by simple manipulation the vertical shank 27 is bent back to permit it to spring over the tip of the lug 23, as shown by dotted line in Fig. 9. As soon as the pressure is released the vertical shank will immediately spring under the lug 23 into the position shown in full lines in said figure.

In another modification of my invention, shown in Fig. 10, the conduit or cable clamp 29 is provided with a hook portion 30 and a base 31. This base is provided with two oppositely disposed vertically arranged locking surfaces or lugs 32 and 33 and with a horizontally arranged lug 34. In this form of my invention the vertical shank 27 of the bridle ring 24 is first positioned in the lugs 32 and 33 and then the open ring 25 is raised vertically, as shown in dotted lines in Fig. 10, so as to flex or bend the horizontal shank 26 to permit it to snap over the end of the lug 34. These lugs are all preferably, though not necessarily, bent, peened or worked down with a hammer the same as shown in Figs. 4 and 5.

Instead of using a plurality of lugs I may, in some instances, provide my bridle ring with an arm or surface to engage in a hole in the conduit or cable clamp, and use only one locking lug. In Figs. 11 and 12, I have shown a conduit or clamp 35 having a hook portion 36, a base 37 provided with a hole 38 and with a lug 39. This conduit or cable clamp is used to support a cable 4 in the same manner as in the other constructions. When it is desirable to string bridle wires 10, 10 I use a bridle ring 40 having an open ring 41, a horizontal shank 42, Fig. 12, and an inturned arm 43.

In this form of my invention the arm 43, of the horizontal shank 42, is inserted in the hole 38 in the base 37 and the shank 42 brought into engagement behind the lug 39 as shown in Figs. 11 and 12. The lug 39 is then preferably hammered or peened so as to press the lug down firmly upon the shank 42.

Another modification of my invention is shown in Fig. 13, in which the conduit or cable clamp 44 is provided with the hook portion 45 and base 46. This base portion 46 is provided with a hole 47 and a lug 48 in the same vertical plane. In this form of my invention the bridle ring 49 is not provided with a horizontal shank but simply has an inturned arm similar to the arm 62, Fig. 15, and fits into the hole 47 in the base 46, Fig. 13. The lug 48 is then bent down to firmly hold the bridle ring in its proper position.

In another form of my invention I provide the base 50 of the conduit or cable clamp 51, Fig. 14 with two oppositely disposed lugs 52 and 53, and also with an opening 54. With this form of my invention the bridle ring 40 is adapted to coöperate, it being simply necessary to somewhat increase the length of the horizontal shank 42, so that it will coöperate with the two lugs 52 and 53.

In another modification of my invention, I provide a base 55, Fig. 15, with two oppositely disposed lugs 56 and 57 and also with a hole 58, the lugs and hole being in the same vertical plane. In this form of my invention the bridle ring 59 is provided with an open ring 60 and with a vertical shank 61 terminating in an arm 62 which fits into the hole 58; the lugs 56 and 57 engage with the vertical shank 61.

To disconnect the different forms of bridle rings from the different forms of conduit or cable clamps shown, whenever it may be desirable to remove the runs of bridle wires, it is merely necessary to reverse the respective operation of assembling the parts herein described. In those cases where the lugs have been bent or peened down, it will of course be necessary to bend them back with a proper tool sufficiently to permit the removal of the shank.

It will be noted that in all forms of my invention the bridle ring can readily be attached by simple manipulation and without touching the securing screw 6. Further, no tapping or screwthreading of the conduit or cable clamp is required, nor is it necessary to place screw threads upon any one of the different forms of bridle rings which I have illustrated and described. By using one thickness of sheet metal, and avoiding the necessity of providing it with screw threads saves considerable expense in the manufacture of the article and reduces the amount of metal necessary to make the conduit or cable clamp.

Having thus described this invention in connection with illustrative embodiments thereof, to the details of which I do not desire to be limited, what is claimed as new, and what is desired to secure by Letters Patent is set forth in the appended claims.

What I claim is:—

1. A new article of manufacture comprising a conduit or cable clamp having a hook portion and a base, the base being provided with means to receive the end of a bridle ring and with additional means to coöperate with other portions of the bridle ring.

2. A new article of manufacture comprising a conduit or cable clamp having a hook portion and a base, the base being provided with a hole to receive the end of a bridle ring and with a bendable lug or lugs to coöperate with the shank of a bridle ring.

3. A new article of manufacture comprising a conduit or cable clamp formed from sheet metal having a hook portion and a base, the base being provided with a hole to receive the end of a bridle ring, and also with one or more lugs stamped up from the metal of the base.

4. The combination of a conduit or cable clamp having a hook portion and a base, the base being provided with a hole and with one or more lugs to coöperate with the shank of a bridle ring, and a bridle ring having an arm to fit into the hole, and a shank to be engaged by the lug or lugs.

5. A new article of manufacture comprising a pigtail bridle ring having an open ring, a shank, and an arm at the end of the shank extending in a plane parallel to the open ring and adapted to fit into a hole in a coöperating conduit or cable clamp.

HENRY B. NEWHALL.

Witnesses:
A. M. WILLIAMS,
M. R. RYAN.